US011878507B2

United States Patent

(12) United States Patent
Hoefnagels et al.

(10) Patent No.: US 11,878,507 B2
(45) Date of Patent: Jan. 23, 2024

(54) PRINTING APPARATUS WITH UNIFORM COOLED ROLLER

(71) Applicant: XEIKON MANUFACTURING N.V., Lier (BE)

(72) Inventors: Kim Louis Jozephus Hoefnagels, Schoten (BE); Maarten Achten, Zonhoven (BE); Wouter Bart Tinne Leus, Rumst (BE)

(73) Assignee: XEIKON MANUFACTURING N.V, Lier (BE)

( * ) Notice: Subject to any disclaimer, the term of this patent is extended or adjusted under 35 U.S.C. 154(b) by 128 days.

(21) Appl. No.: 17/626,160

(22) PCT Filed: Jul. 2, 2020

(86) PCT No.: PCT/EP2020/068660
§ 371 (c)(1),
(2) Date: Jan. 11, 2022

(87) PCT Pub. No.: WO2021/018507
PCT Pub. Date: Feb. 4, 2021

(65) Prior Publication Data

US 2022/0314600 A1 Oct. 6, 2022

(30) Foreign Application Priority Data

Jul. 26, 2019 (NL) ..................................... 2023575

(51) Int. Cl.
*B41F 23/04* (2006.01)
*B41J 29/377* (2006.01)
*G03G 21/20* (2006.01)

(52) U.S. Cl.
CPC ...... *B41F 23/0476* (2013.01); *B41F 23/0479* (2013.01); *B41J 29/377* (2013.01); *G03G 21/206* (2013.01)

(58) Field of Classification Search
CPC ... B41F 23/0476; B41F 31/002; B41J 29/377; G03G 21/206; B21B 2027/083; B22D 11/0682
(Continued)

(56) References Cited

U.S. PATENT DOCUMENTS 5,370,177 A * 12/1994 Fey ...................... D21G 1/0266 492/46
6,241,002 B1 * 6/2001 Russell .............. B22D 11/0682 164/428

(Continued)

FOREIGN PATENT DOCUMENTS

CN 109016308 A * 12/2018 ............. B29C 43/24
DE 4036121 A1 1/1992

(Continued)

OTHER PUBLICATIONS

International Search Report and Written Opinion for the International Patent Application No. PCT/EP2020/068660, dated Oct. 1, 2020, 11 pages.

*Primary Examiner* — Daniel J Colilla
(74) *Attorney, Agent, or Firm* — KDW Firm PLLC

(57) ABSTRACT

A printing apparatus includes a cooling system for cooling a print medium. The cooling system includes a cooling member with a support surface configured for supporting the print medium. The cooling member has a first end and a second end and the support surface extends in a lateral direction between the first end and the second end. The cooling member is provided with supply channels and return channels extending between the first and the second end. A fluid circulation means supplies fluid through the supply channels from the first end to the second end, and back through the return channels from the second end to the first end.

21 Claims, 10 Drawing Sheets

(58) Field of Classification Search
USPC .......................................................... 101/488
See application file for complete search history.

(56) References Cited

U.S. PATENT DOCUMENTS

| | | | | |
|---|---|---|---|---|
| 2004/0168602 | A1* | 9/2004 | Blohdorn | B41C 1/1083 101/487 |
| 2006/0276317 | A1* | 12/2006 | Pietikainen | D21G 1/0266 492/59 |
| 2011/0052249 | A1* | 3/2011 | Iijima | G03G 15/6573 165/104.31 |
| 2013/0004197 | A1 | 1/2013 | Yona et al. | |
| 2015/0031515 | A1* | 1/2015 | Mor-Yosef | G03G 15/14 492/15 |

FOREIGN PATENT DOCUMENTS

| | | | |
|---|---|---|---|
| DE | 10246394 | A1 | 4/2004 |
| EP | 0987206 | A2 | 3/2000 |
| EP | 1621086 | A1 | 2/2006 |
| EP | 1738916 | A1 | 1/2007 |
| EP | 1813432 | A1 | 8/2007 |
| EP | 3479982 | A1 | 5/2019 |
| WO | 2017198344 | A1 | 11/2017 |

* cited by examiner

PRINTING APPARATUS WITH UNIFORM COOLED ROLLER

This application is a national stage filing under 35 U.S.C. 371 of pending International Application No. PCT/EP2020/068660, filed Jul. 2, 2020, which claims priority to Netherlands patent application serial number 2023575, filed Jul. 26, 2019, the entirety of which applications are incorporated by reference herein.

FIELD OF INVENTION

The field of the invention relates to printing apparatus comprising a cooling system for cooling a print medium. Particular embodiments relate to the field of digital printing apparatus for so-called "continuous" webs, where the web is cooled by transporting it over a cooling member.

BACKGROUND

Printing apparatus with a cooling member, typically in the form of a cooling roller, are known. A print medium moving through the printing apparatus is cooled by guiding it over a cooling roller. The cooling roller may comprise an outer cylinder and a coaxial inner cylinder, wherein cooling fluid, e.g. water, flows in between the outer and the inner cylinder.

In another existing embodiment a cooling roller is provided with a plurality of air channels, and air is sent from one end of the cooling roller to the other end of the cooling roller.

Because the fluid heats up as it travels through the cooling roller, typically the temperature variation along an axial direction of the cooling roller may be significant.

SUMMARY

The object of embodiments of the invention is to provide a printing apparatus with an improved cooling system, and in particular a cooling system allowing for a more uniform cooling of a print medium compared to prior art solutions.

According to a first aspect of the invention there is provided a printing apparatus comprising a cooling system for cooling a print medium moving in a movement direction through the printing apparatus. The cooling system comprises a cooling member and a fluid circulation means. The cooling member has a support surface configured for supporting the print medium. The cooling member has a first end and a second end and the support surface extends in a lateral direction at an angle with respect to the movement direction, e.g. perpendicular on the movement direction, between said first end and said second end. The cooling member is provided with multiple supply channels and multiple return channels extending between the first and the second end. The fluid circulation means is configured for supplying fluid through the supply channels from the first end to the second end, and back through the return channels from the second end to the first end.

By having multiple supply channels and multiple return channels, it becomes possible to compensate the lower temperature at the first end where the cooling liquid enters the supply channels with the higher temperature of the fluid in the return channels at the first end. More in particular a more uniform left-right temperature distribution, as seen in the lateral direction, can be obtained. Also, by having multiple supply and return channels a more uniform temperature distribution can be obtained in the movement direction.

Preferably, the supply channels comprise at least three, preferably at least four supply channels, and the return channels comprise at least three, preferably at least four return channels. More preferably, the supply channels comprise at least six, preferably at least eight, more preferably at least ten supply channels, and/or the return channels comprise at least six, preferably at least eight, more preferably at least ten return channels. By increasing the number of supply channels, the uniformity may be further improved. Especially for large cooling members, the total number of channels may be large, e.g. even more than twenty.

The fluid is preferably a liquid, such as water or a water-based liquid. However, in some embodiments the fluid may be a gas.

Preferably, the supply and return channels are distributed according to a regular pattern comprising a sequence of at least one first supply channel, at least one first return channel, at least one second supply channel, and at least one second return channel. In other words, preferably the supply and return channel are alternated in a regular manner to make the temperature distribution more uniform.

Preferably, the cooling member comprises a peripheral portion and the supply and return channels are distributed across the peripheral portion. The peripheral portion is located next to the support surface, and by providing the channels in the peripheral portion an efficient cooling is obtained.

The cooling member may comprise a roller comprising the peripheral portion and a central portion. Especially for larger rollers, the central portion may be at least partially hollow. In that manner the cooling roller can weigh less. The central portion may comprise a hollow cylindrical passage. Optionally, radially oriented interconnecting ribs or plates may be arranged in the hollow passage for giving extra strength to the cooling member and/or for creating heat transfer bridges between opposite sides of the peripheral portion.

In a preferred embodiment, the supply and return channels comprise at least three supply channels and at least three return channels distributed along the circumference of the roller, and at the second end, each supply channel of said at least three supply channels is connected to a return channel of said at least three return channels, said return channel being located in an opposite half of the roller at the second end as compared to the associated supply channel.

The roller has a diameter d. Preferably, the distance between adjacent supply and return channels, seen along a circle adjoining the adjacent supply and return channels, is smaller than d/5, preferably smaller than d/10. Preferably, the distance between the support surface and each channel of the supply and return channels is smaller than d/5, preferably smaller than d/8. In other words, it is preferred when the channels are located relatively close to the support surface and when a large portion of the circumference of the roller is provided with channels. In that manner an efficient and relatively uniform cooling can be obtained.

Preferably, the roller has a diameter d which is larger than 30 mm, preferably larger than 100 mm, and e.g. larger than 500 mm. Preferably, the distance between adjacent supply and return channels, seen along a circle adjoining the adjacent supply and return channels, is between 1 mm and 15 mm. Preferably, the distance between the support surface and each channel of the supply and return channels is between 1 mm and 15 mm.

Preferably, the supply and return channels are substantially parallel. The supply and return channels may be straight or curved, e.g. helical.

Preferably, seen in a cross section perpendicular on the lateral direction, a total surface area of the supply channels is substantially equal to a total surface area of the return channels. In that manner the volumetric flow rate in the supply channels is substantially equal to the volumetric flow rate in the return channels.

Preferably, seen in a cross section perpendicular on the lateral direction, the circumference of each channel is larger than a circumference of a circle with the same surface area, preferably at least 1.25 times larger than the circumference of a circle with the same surface area. For example, the circumference of each channel may be at least 1.5 times or at least 2 times or at least 3 times or even at least 4 times larger than a circumference of a circle with the same surface area. To achieve such larger circumference, seen in a cross section perpendicular on the lateral direction, the circumference of each channel may comprise inwardly protruding portions such as concave portions, and outwardly protruding portions, such as convex portions.

Preferably, the cooling member is made of any one of the following materials aluminium, aluminium alloy, magnesium alloy, steel, copper, steel alloy, copper alloy, or a combination thereof.

Preferably, the cooling member is provided with a coating at the support surface, preferably a coating made of any one of the following materials: a polytetrafluoroethylene (PTFE) based material such as a nickel-PTFE based material, a ceramic material, a diamond-like-carbon (DLC) material, a metal. A coating will increase the wear resistance and may further enhance the smoothness of the surface.

Alternatively, the cooling member may have a polished surface. In that manner the surface can have a low surface energy and can have similar advantageous properties as achieved with a coating.

In an exemplary embodiment, the fluid circulation means comprises a first coupling flange connected to the first end and a second coupling flange connected to the second end. The second coupling flange may comprise connecting channels for connecting each supply line to at least one return line of the return lines. Preferably the connecting channels are such that each supply channel ending in a first half of the cooling member is connected to a return channel starting in an opposite half of the cooling member. By making the connections in this manner, cooling fluid which runs through a supply channel above which a print medium is present, may be sent to a return channel where no print medium is present and vice versa. This will further enhance the uniformity of the temperature distribution, especially in the movement direction.

In a possible embodiment, the second coupling flange comprises or delimits a mixing chamber, and each supply line and each return line is connected to the mixing chamber. Also, by using a mixing chamber, differences in temperature between cooling fluid coming from a supply channel above which a printing medium was present, and cooling fluid coming from a supply channel above which no printing medium was present, can be compensated. The mixing chamber may be delimited by a circular groove arranged in the second coupling flange. The mixing chamber may be formed at least partially in the second coupling flange and/or at least partially in the second end of the cooling member. The mixing chamber is in fluid communication with the supply and return channels.

The first coupling flange may comprise a central inlet dividing in inlet branches connected to the supply channels, and an outlet dividing in outlet branches connected to the return lines. The inlet and the outlet may be coaxial. For example, the outlet may surround the inlet, or vice versa. In that manner the inlet and outlet may be coupled e.g. to a double-flow rotary union such that the cooling member with the first and second coupling flanges can be rotated around its axis in operation.

In an alterative embodiment, the fluid circulation means comprises a first set of tubes connected to the first end and/or a second set of tubes connected to the second end. In such an embodiment, if a rotary coupling is needed, e.g. at the first end, such coupling may be mounted to a collector, wherein the first set of tubes is connected to the collector.

Optionally, the cooling member is made of multiple parts. Preferably, the cooling member comprises an inner part and an outer part, and each supply and return channel is delimited by both the inner and the outer part. For example, the inner part may be a cylindrical part having multiple grooves in its outer surface for creating lower portions of the supply and return channels, and the outer part may be a cylindrical part having an inner surface provided with multiple grooves for creating upper portions of the supply and return channels. It is noted that one of the inner and outer parts may also have a flat outer and inner surface, respectively. Also, seen in the lateral direction, the cooling member may comprise a plurality of sections, preferably connected to each other in a fluid tight manner. Also, a long cylindrical outer section with a flat inner surface could be combined with a plurality of cylindrical inner sections fitting one after the other, seen in an axial direction, in the cylindrical outer section, wherein the outer surface of the cylindrical inner sections is provided with grooves for creating the supply and return channels.

Preferably, the printing apparatus further comprises a roller system with a plurality of rollers for guiding the print medium in the movement direction, wherein the cooling member corresponds with a roller of said plurality of rollers. In other words, a roller may have both the function of guiding the print medium as well as of controlling the temperature of the print medium.

Preferably, the printing apparatus further comprises a printing unit, also called image development and transfer unit, and at least one of a fusing unit or a drying unit or curing unit arranged downstream of the printing unit. A cooling member may be arranged downstream of the fusing or drying or curing unit and/or in the fusing or drying or curing unit and/or upstream of the fusing or drying or curing unit, e.g. between the printing unit and the fusing or drying or curing unit. Thus, the cooling member may be used for cooling before, during and/or after fusing of a printed image or for cooling before, during and/or after drying of a printed image or for cooling before, during and/or after curing of a printed image.

For example, a printing apparatus for use with toner or water-based ink may comprise a printing unit, a fusing unit downstream of the printing unit, and a cooling member downstream of the fusing unit. The fusing unit may be an intermediate fusing station for pinning an image printed by the printing unit. In the latter case, optionally further printing unit may be provided downstream of the intermediate fusing unit.

In another example, a printing apparatus for use with curable toner or ink may comprise a printing unit, a curing unit downstream of the printing unit, and a cooling member in the curing unit for supporting the medium during curing.

In an exemplary embodiment, the printing apparatus comprises a printing unit and a cooling member upstream of the printing unit. Such cooling member may be used for conditioning the print medium prior to printing.

The printing unit may be a digital printing means, e.g. an inkjet printing means or a xerography printing means, e.g. a dry toner printing means.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
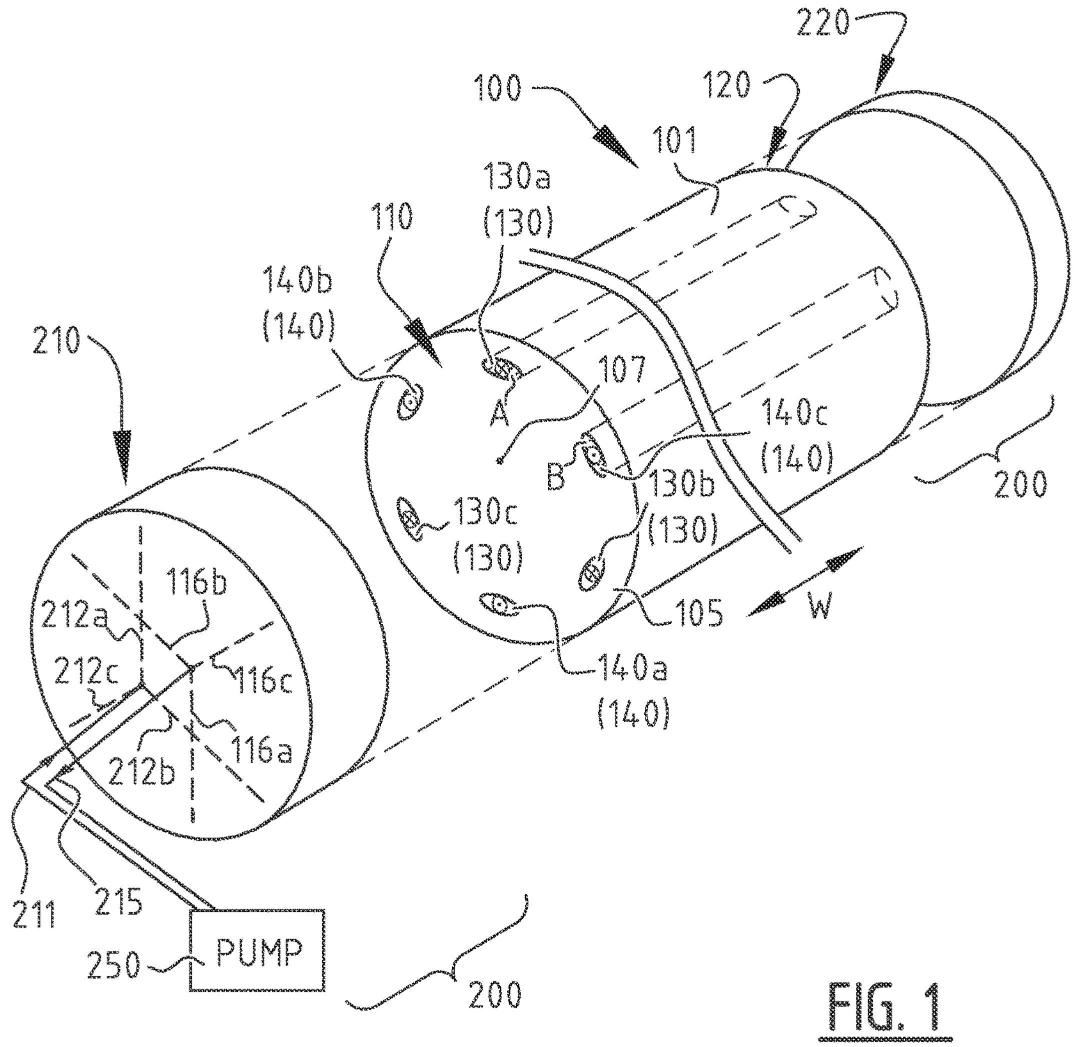
FIG. 1 is a schematic exploded view of an exemplary embodiment of a cooling system for use in a printing apparatus.
Figure 2:
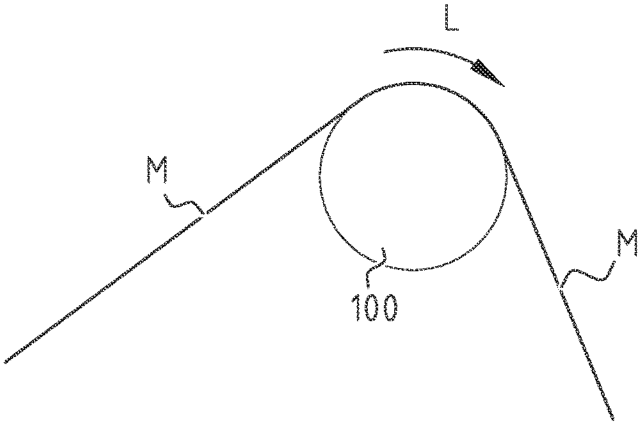
FIG. 2 is a schematic cross-sectional view illustrating how a print medium may be transported over a cooling member.

FIGS. 1 and 2 illustrate an exemplary embodiment of a cooling system for use in a printing apparatus. The cooling system is used for cooling a print medium M moving in a movement direction L through the printing apparatus, see FIG. 2. It is noted that in some printing apparatus the print medium M may first move in a first movement direction through the printing apparatus and next in a second movement direction opposite to the first movement direction through the printing apparatus. For example, the printing apparatus may be configured for printing on a "continuous" print medium M, typically called a web, wherein the web M is cooled by transporting it over a cooling member 100. However, more generally, the cooling member 100 may be used in any printing apparatus which requires cooling of a print medium M.

The cooling system comprises a cooling member 100 and a fluid circulation means 200. The cooling member 100 has a support surface 101 configured for supporting the print medium M. The cooling member 100 has a first end 110 and a second end 120 and the support surface 101 extends in a lateral direction W, here perpendicular on the movement direction L, between the first end 110 and the second end 120. The cooling member 100 is provided with supply channels 130 and return channels 140 extending between the first end 110 and the second end 120. In the illustrated embodiment the cooling member 100 has the shape of a roller, and the roller may be mounted rotatably around an axis. The roller may be driven using drive means (not illustrated) to rotate, typically at a predetermined speed. However, in other non-illustrated embodiments, the cooling member may be a block or a table. Such block or table may be static or moving. Also a polygonal roller, such as a square or triangular roller is possible.

The fluid circulation means 200 is configured for supplying fluid through the supply channels 130 from the first end 110 to the second end 120, and back through the return channels 140 from the second end 120 to the first end 110.

Preferably, the supply channels 130 comprise at least three, preferably at least four supply channels. In the example of FIG. 1, three supply channels 130*a*, 130*b*, 130*c* are provided in the cooling member 100. Similarly, preferably return channels 140 comprise at least three, preferably at least four return channels. In the example of FIG. 1, three return channels 140*a*, 140*b*, 140*c* are provided in the cooling member 100. It is noted that the number of supply channels 130 does not have to be equal to the number of return channels 140. For example, there may be provided at least two return channels per supply channel, or vice versa.

By having multiple supply and return channels 130, 140 distributed over the cooling member 100, a temperature distribution along the cooling member is more uniform compared to prior art embodiments having e.g. a single peripheral supply channel and a single axial return channel. Indeed, the cooling fluid in the supply channels 130 will have a lower temperature at the first end 110 than at the second end 120, and the return channels will have a lower temperature at the second end 120 than at the first end 110. By having multiple supply and return channels 130, 140 distributed over the cooling member 100, the left-right temperature distribution, seen in the lateral direction W, can be improved.

Preferably, the supply and return channels 130, 140 are distributed according to a regular pattern comprising e.g. a sequence of a first supply channel 130*a*, a first return channel 140*a*, a second supply channel 130*b*, a second return channel 140*b*, a third supply channel 130*c*, and a third return channel 140*c*. In other words, preferably the supply and return channels are alternated, seen in the movement direction of the printing medium M, to improve the uniformity of the temperature distribution along the cooling member.

Figure 8:
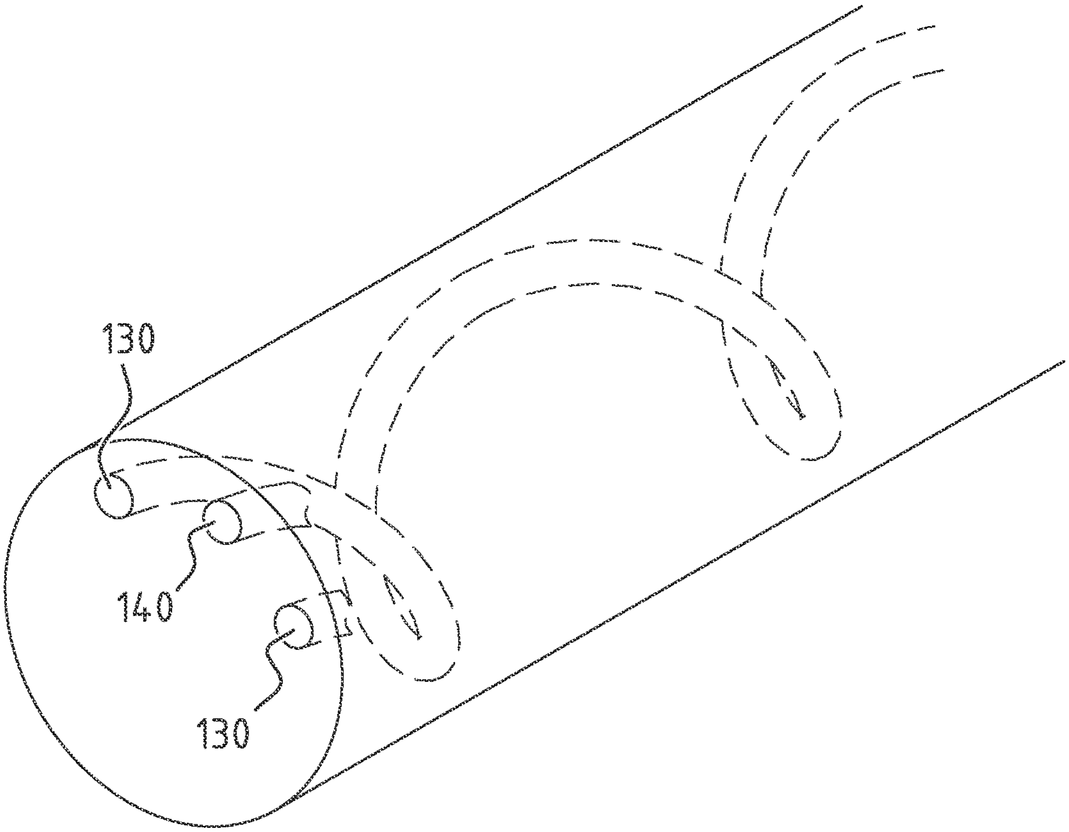
FIG. 8 is a schematic perspective view of another exemplary embodiment of a cooling member.

Preferably, the supply and return channels 130, 140 are substantially parallel. The supply and return channels may be straight, as illustrated in FIG. 1, but may also be curved, e.g. helically curved, as illustrated in FIG. 8.

Preferably, the cooling member 100 comprises a peripheral portion 105 and the supply and return channels are distributed across the peripheral portion. When the cooling member 100 is a roller, the peripheral portion 105 is a layer located near the support surface 101 and around a central portion 107. When the cooling member is a block or table (not illustrated), the peripheral portion may be layer adjacent the flat support surface.

Preferably, seen in a cross section perpendicular on the lateral direction, a total surface area of the supply channels 130, here 3*A, is substantially equal to a total surface area of the return channels 140, here 3*B. In that manner, a volumetric flow rate of a supply fluid flow can be substantially the same as a volumetric flow rate of a return fluid flow.

Figure 9A:
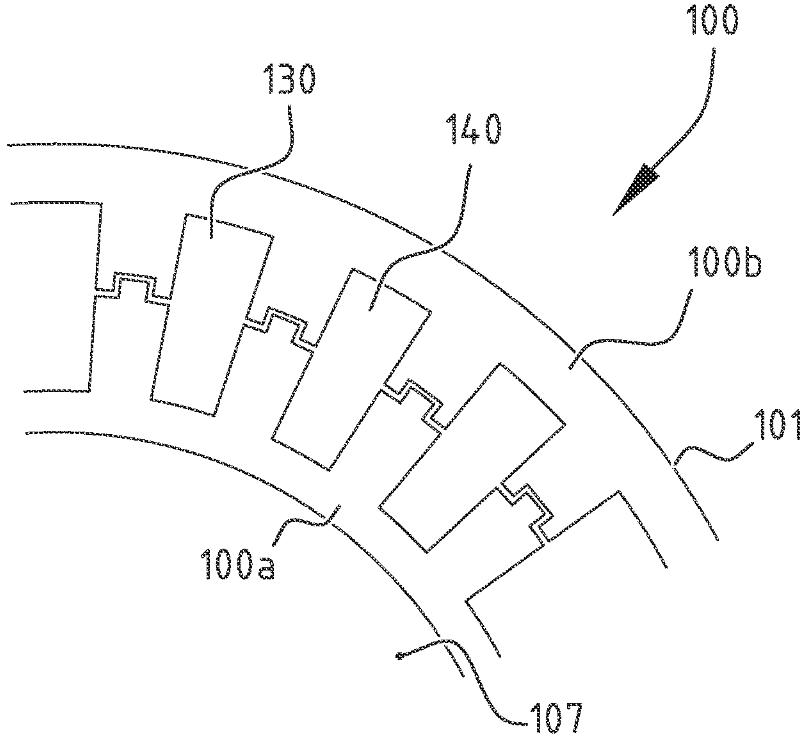
FIGS. 9A and 9B are a schematic partial cross-sectional views of two further exemplary embodiments of a cooling member.
Figure 9B:
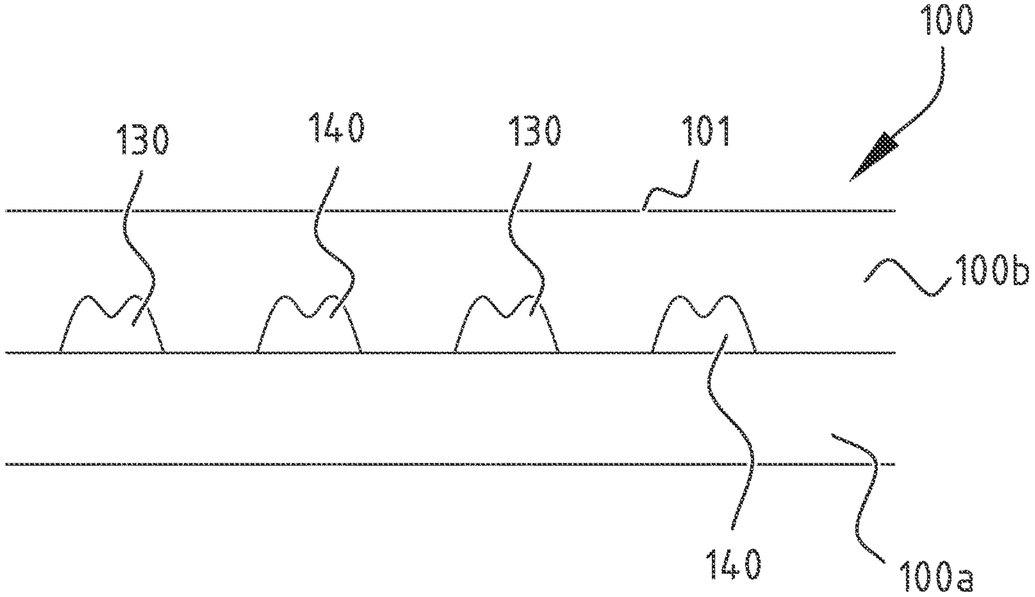

The cooling member 100 may be made of any one of the following materials: aluminium, aluminium alloy, magnesium alloy, steel, copper, copper alloy, steel alloy. Especially the peripheral portion 105 in which the channels 130, 140 are arranged is made preferably of a material with good heat conductive properties, such as any one of the materials listed above. For example, the cooling member 100 may be an extruded member. The cooling member 100 may be made in one piece as illustrated in FIG. 1, but may also be made of multiple pieces as illustrated in FIGS. 9A and 9B for a roller and a table, respectively. For example, in the embodiment of FIG. 9A, the cooling roller 100 comprises an inner part 100*a* and an outer part 100*b*, and each supply and return channel 130, 140 is delimited by both the inner part 100*a* and the outer part 100*b*. In the embodiment of FIG. 9B, the cooling table 100 comprises an inner lower part 100*a* and an outer upper part 100*b*, and each supply and return channel 130, 140 is delimited by both the inner part 100*a* and the outer part 100*b*. The outer upper part 100*b* has an upper surface forming the support surface 101 and a lower surface in which the channels 130, 140 are formed. Although not illustrated, the skilled person understands that the cooling member 100 may also comprise multiple sections connected to each other, wherein the sections extend next to each other seen in the lateral direction W of the cooling member, i.e. seen in the axial direction in the case where the cooling member is a roller.

Optionally, the cooling member 100 may provided with a coating at the support surface 101, preferably a coating made of any one of the following materials: a polytetrafluoroethylene (PTFE) based material such as a nickel-PTFE based material, a ceramic material, a diamond-like-carbon (DLC) material, a metal. Such a coating provides a low surface roughness and hence a low friction coefficient to the cooling member 100, whilst also having good heat conductive properties. Further the coating may have a good wear resistance. The coating may have a thickness e.g. between 5 micron and 300 micron. Similar advantageous effects may be achieved when the cooling member 100 is provided with a polished surface.

The fluid circulation means comprises a first coupling flange 210 connected to the first end 110, a second coupling flange 220 connected to the second end 120, and a pump 250 connected to the first coupling flange. The first coupling flange 210 comprises a central inlet 211 dividing in inlet branches 212*a*, 212*b*, 212*c* connected to the supply channels 130*a*, 130*b*, 130*c*, and an outlet 215 dividing in outlet branches 216*a*, 216*b*, 216*c* connected to the return lines 140*a*, 140*b*, 140*c*. It is noted that FIG. 1 is a schematic figure, and that in practice the outlet 215 may surround the inlet 211. The inlet branches 212*a*, 212*b*, 212*c* may be located in a first plane of the first coupling flange 210 and the outlet branches 216*a*, 216*b*, 216*c* may be located in a second plane of the first coupling flange 210, at a distance of the first plane. The second coupling flange 220 comprises connecting channels (not shown in FIG. 1) for connecting each supply line 130 to at least one return line 140. Instead of using coupling flanges 110, 120 it is also possible to simply use connection tubes to connect the pump 250 with the first end 110 and to connect the supply channels 130 to the return channels 140 at the second end 120. In order to allow the cooling member 100 with flanges 210, 220 to be rotated, the coupling between the pump 250 and the first coupling flange 210 may be done using e.g. a duo-flow rotary union.

Figure 3:
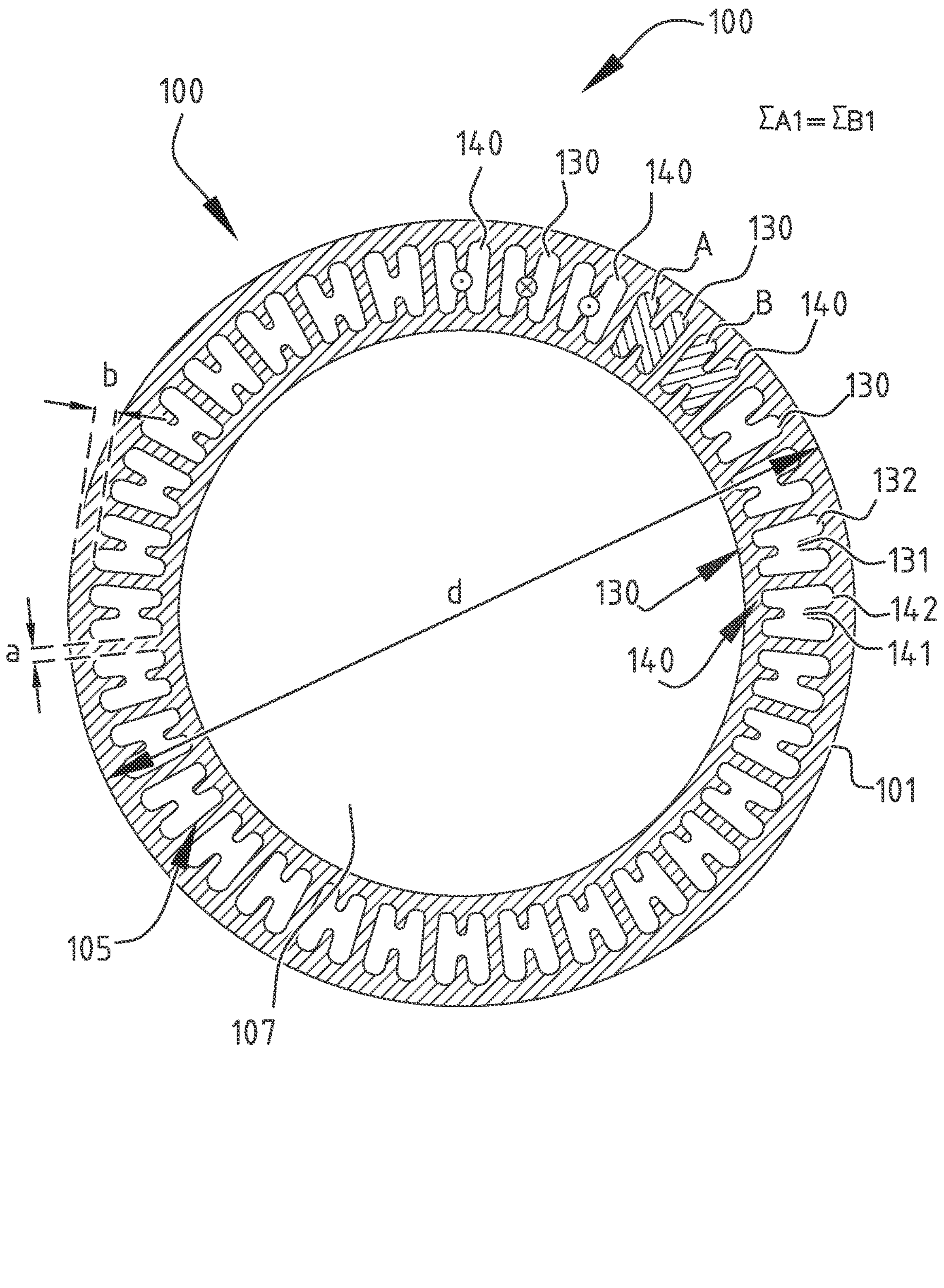
FIG. 3 is a schematic cross-sectional view of an exemplary embodiment of a cooling member.

FIG. 3 illustrates in a schematic cross-sectional view a further developed exemplary embodiment of a cooling member 100. Similar or identical parts have been indicated with the same reference numerals as in FIG. 1, and the description given above for FIG. 1 also applies for the components of FIG. 3. Preferably, the cooling member 100 is provided with at least six, more preferably at least eight, and even more preferably at least ten supply channels 130, e.g. sixteen supply channels as illustrated in FIG. 3. Similarly, preferably, at least six, more preferably at least eight, even more preferably at least ten return channels 140, are provided. In a preferred embodiment, as illustrated in FIG. 3, the central portion 107 of the cooling member 100 is at least partially hollow. In that manner, the cooling member 100 can remain relatively light-weight, also for larger diameters.

The cooling roller 100 of FIG. 3 has a diameter d. Preferably, a distance a between adjacent supply and return channels 130, 140, seen along a circle adjoining the adjacent supply and return channels, is smaller than d/5, preferably smaller than d/10. It is noted that for very lager rollers, the distance a may be smaller than d/100. Preferably, the distance b between the support surface 101 and each channel 130, 140 is smaller than d/5, more preferably smaller than d/8. It is noted that for very lager rollers, the distance b may be smaller than d/100.

The roller may have a diameter d which is larger than 30 mm, preferably larger than 100 mm, and e.g. larger than 500 mm. The distance a may be e.g. between 2 mm and 15 mm. The distance b may be e.g. between 3 and 15 mm. Depending on the material used for the cooling member, the thickness of the outer layer (corresponding with the distance b) may be determined so that a good heat conduction is achieved between the channels 130, 140 and the support surface.

Preferably, seen in a cross section perpendicular on the lateral direction W, the circumference of each channel 130, 140 is larger than a circumference of a circle with the same surface area A, B as the channel 130, 140, preferably at least 1.25 times larger than the circumference of a circle with the same surface area, more preferably at least 1.5 times larger than the circumference of a circle with the same surface area, and e.g. at least 2, 3, 4, or 5 times larger. In that manner, the heat can be transferred through a larger surface area further improving the temperature uniformity and efficiency of the cooling member 100. To that end, seen in a cross section perpendicular on the lateral direction, the circumference of each channel 130, 140 may comprise inwardly protruding portions 131, 141 such as concave portions, and outwardly protruding portions 132, 142, such as convex portions. It is noted that the channels 130, 140 are drawn with rounded edges, but the channels 130, 140 may also have a polygonal shape, seen in a cross section.

Figure 4:
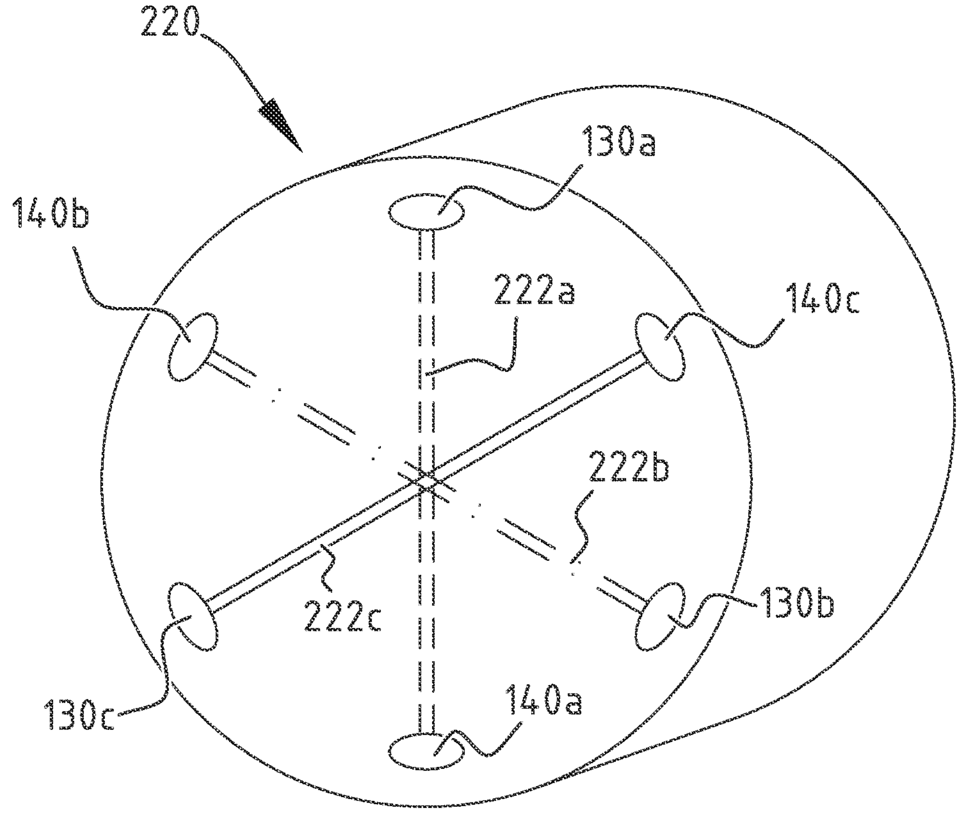
FIG. 4 is a schematic perspective view of an exemplary embodiment of a coupling flange.

FIG. 4 is a schematic perspective view of an exemplary embodiment of a second coupling flange 220 intended to be coupled to the second end 120 of a cooling member 100. As illustrated in FIG. 1, the supply and return channels 130, 140 comprise at least three supply channels 130*a*, 130*b*, 130*c* and at least three return channels 140*a*, 140*b*, 140*c* distributed along the circumference of the cooling roller 100, and, as illustrated in FIG. 4, at the second end 120, each supply channel 130*a*, 130*b*, 130*c* is connected to a return channel 140*a*, 140*b*, 140*c*. The return channel 140*a* is located in an opposite half of the roller 100 at the second end 120 as compared to the associated supply channel 130*a*. Similarly, the return channels 140*b*, 140*c* are located in an opposite half of the roller 100 at the second end 120 as compared to the associated supply channels 130*b*, 130*c*. The second coupling flange 220 comprises connecting channels 222*a*, 222*b*, 222*c* for connecting each supply line 130*a*, 130*b*, 130*c* to an associated return line 140*a*, 140*b*, 140*c*. As illustrated in FIG. 4, preferably the connecting channels 222*a*, 222*b*, 222*c* are such that each supply channel 130*a*, 130*b*, 130*c* ending in a first half of the cooling member 100 is connected to a return channel 140*a*, 140*b*, 140*c* starting in an opposite half of the cooling member 100. It is noted that instead of using a coupling flange 220, it is also possible to use a plurality of tubes for connecting the supply channels 130 to the return channels 140 at the second end 120 of the roller 100.

In another non-illustrated embodiment, the second coupling flange may comprise a mixing chamber, and each supply line and each return line may be connected to the mixing chamber.

Figure 5:
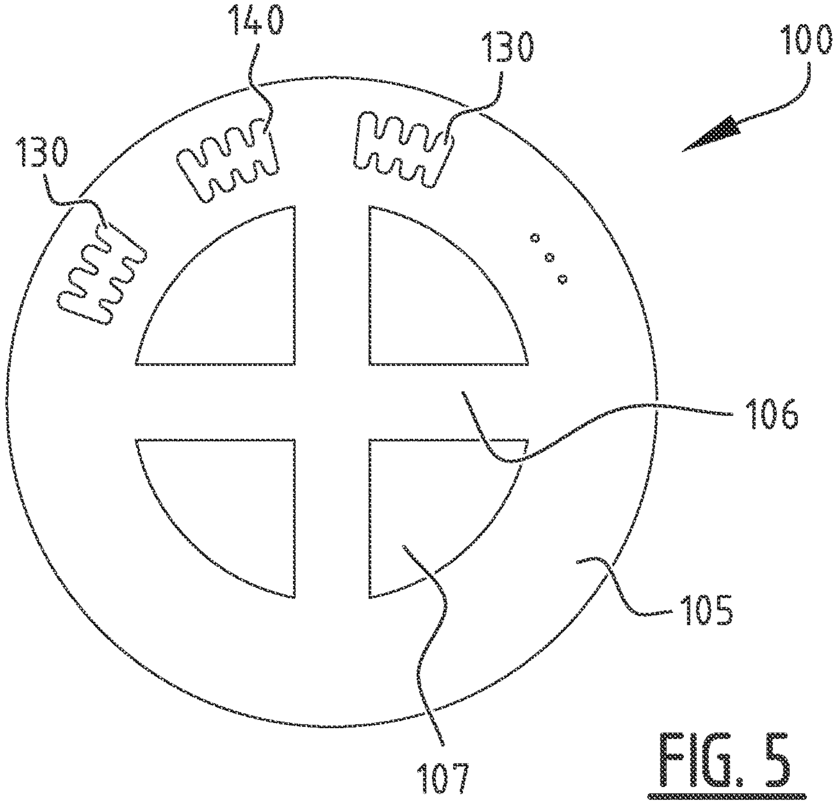
FIGS. 5, 6 and 7 are schematic cross-sectional views of different exemplary embodiments of a cooling member.
Figure 6:
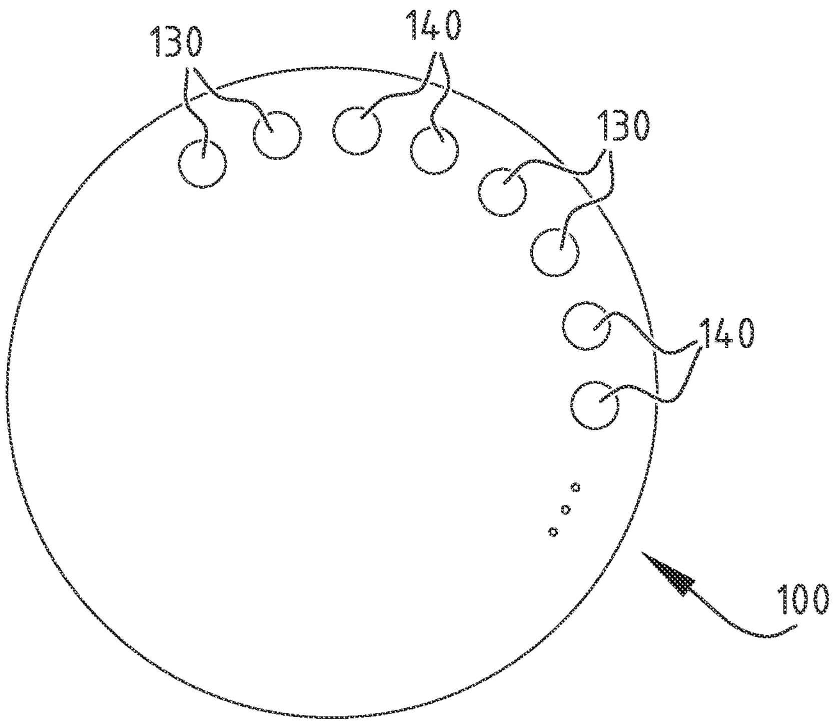
Figure 7:
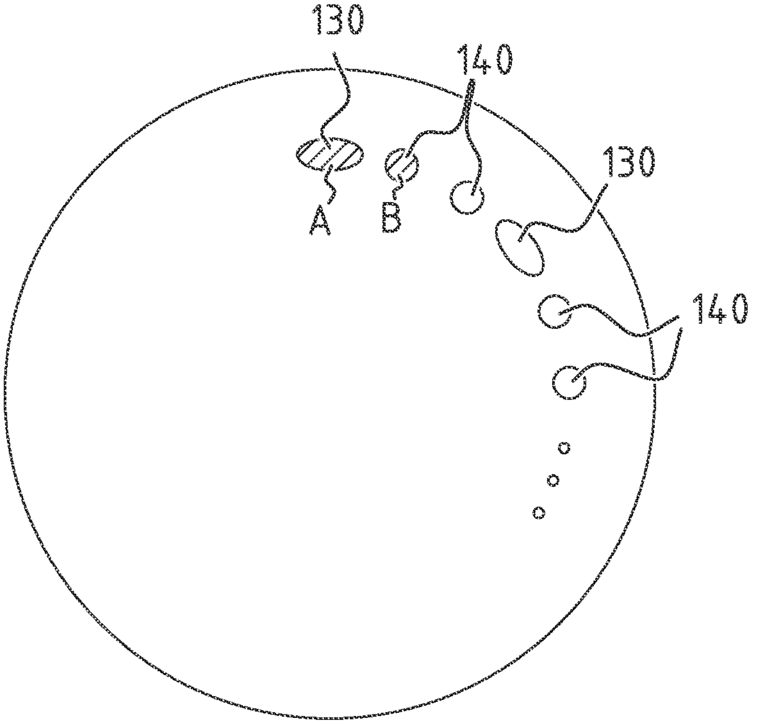

FIGS. 5, 6 and 7 are schematic cross-sectional views of different exemplary embodiments of a cooling member. Similar or identical parts have been indicated with the same reference numerals as in FIG. 1, and the description given above for FIG. 1 also applies for the components of FIGS. 5, 6 and 7. In the embodiment of FIG. 5, the central portion 105 of the cooling roller 100 is partially hollow and comprises radially oriented interconnecting ribs or plates 106 for giving extra strength to the cooling member and/or for creating heat transfer bridges between opposite sides of the peripheral portion 107. The supply and return channels 130, 140 are located around the central portion 105, in the peripheral portion 107.

FIG. 6 shows an embodiment where each time two adjacent supply channels 130 are alternated with two adjacent return channels 140. In this embodiment the channels 130, 140 have a circular cross section, and a large number of channels 130, 140 is distributed regularly along the periphery of the cooling roller 100.

FIG. 7 shows an embodiment where a single supply channel 130 is alternated with two adjacent return channels 140. In such an embodiment, the surface area A of a supply channel 130 may be the double of a surface area B of a return channel 140.

Figure 10:
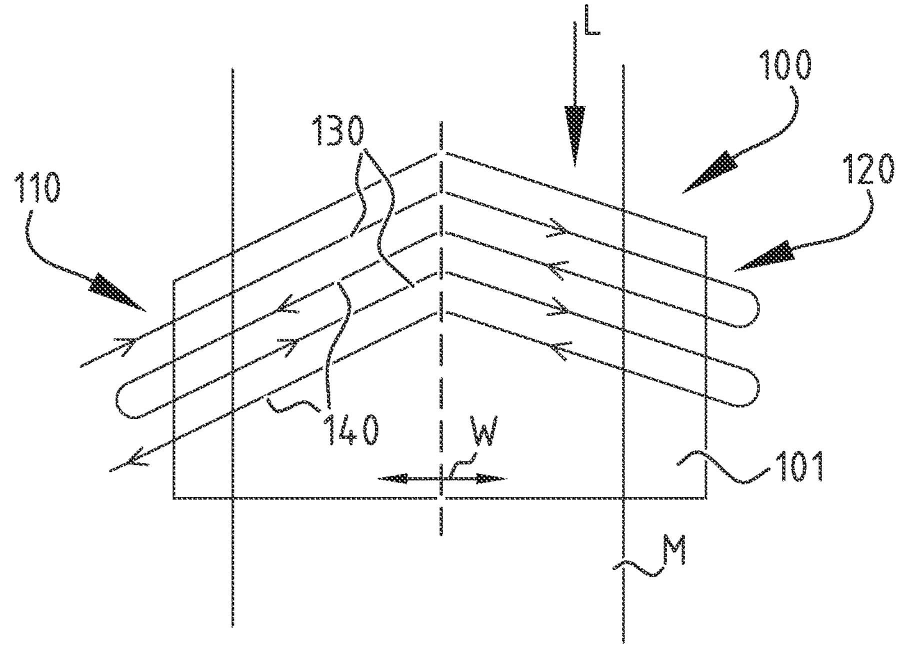
FIGS. 10 and 11 are schematic top views of two further exemplary embodiments of a cooling system of a printing apparatus.
Figure 11:
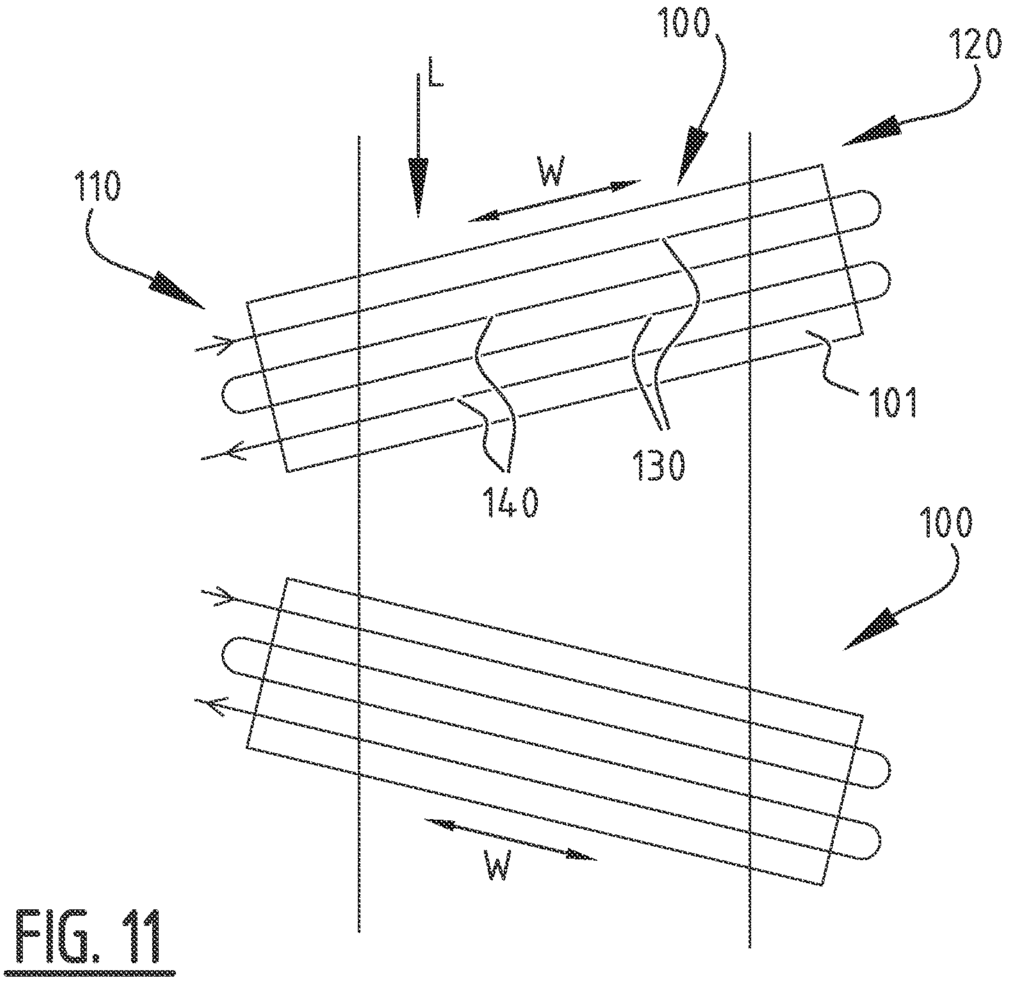

FIGS. 10 and 11 illustrate two further embodiments of a cooling system of a printing apparatus. The cooling system of FIG. 10 comprises a static cooling member 100, here shaped as a table with a triangular portion, but any other shape is possible. The print medium M moves in a movement direction L. The cooling member 100 has a support surface 101 supporting the print medium M. The cooling member 100 has a first end 110 on one side thereof, and a second end 120 at an opposite side thereof. The support surface 101 extends in a lateral direction W between the first end 110 and the second end 120, i.e. between the first and second side of the table 100, located at a left and right side of the print medium M, respectively, when looking in the movement direction L. The cooling member 100 is provided with supply channels 130 and return channels 140 extending between the first and the second end. A fluid circulation means (not shown) supplies fluid through the supply channels 130 from the first end to the second end, and back through the return channels 140 from the second end to the first end. It is noted that the supply channels 130 may be fed in parallel from a common supply as in FIG. 1, or may be fed in series as illustrated in FIG. 10. It is further noted that the arrows of FIG. 10 may be oriented in the opposite direction, i.e. the fluid may be supplied where the print medium has already been partly cooled.

The cooling system of FIG. 11 comprises two static cooling members 100, here shaped as two rectangular tables. Each cooling member 100 has a support surface 101 supporting the print medium M. Each cooling member 100 has a first end 110 on one side thereof, and a second end 120 at an opposite side thereof. The support surface 101 extends in a lateral direction W between the first end 110 and the second end 120, i.e. between the first and second side of the table 100, located at a left and right side of the print medium M, respectively. Here the lateral direction W is at an angle with respect to the movement direction M of the print medium M. In some embodiments this may help with the steering/guiding of the print medium M. Each cooling member 100 is provided with supply channels 130 and return channels 140 extending between the first and the second end 110, 120. A fluid circulation means (not shown) supplies fluid through the supply channels 130 from the first end to the second end, and back through the return channels 140 from the second end to the first end. It is noted that the supply channels 130 may be fed in parallel from a common supply as in FIG. 1, or may be fed in series as illustrated in FIG. 11. It is further noted that the arrows in FIG. 11 may be oriented in the opposite direction.

Figure 12A:
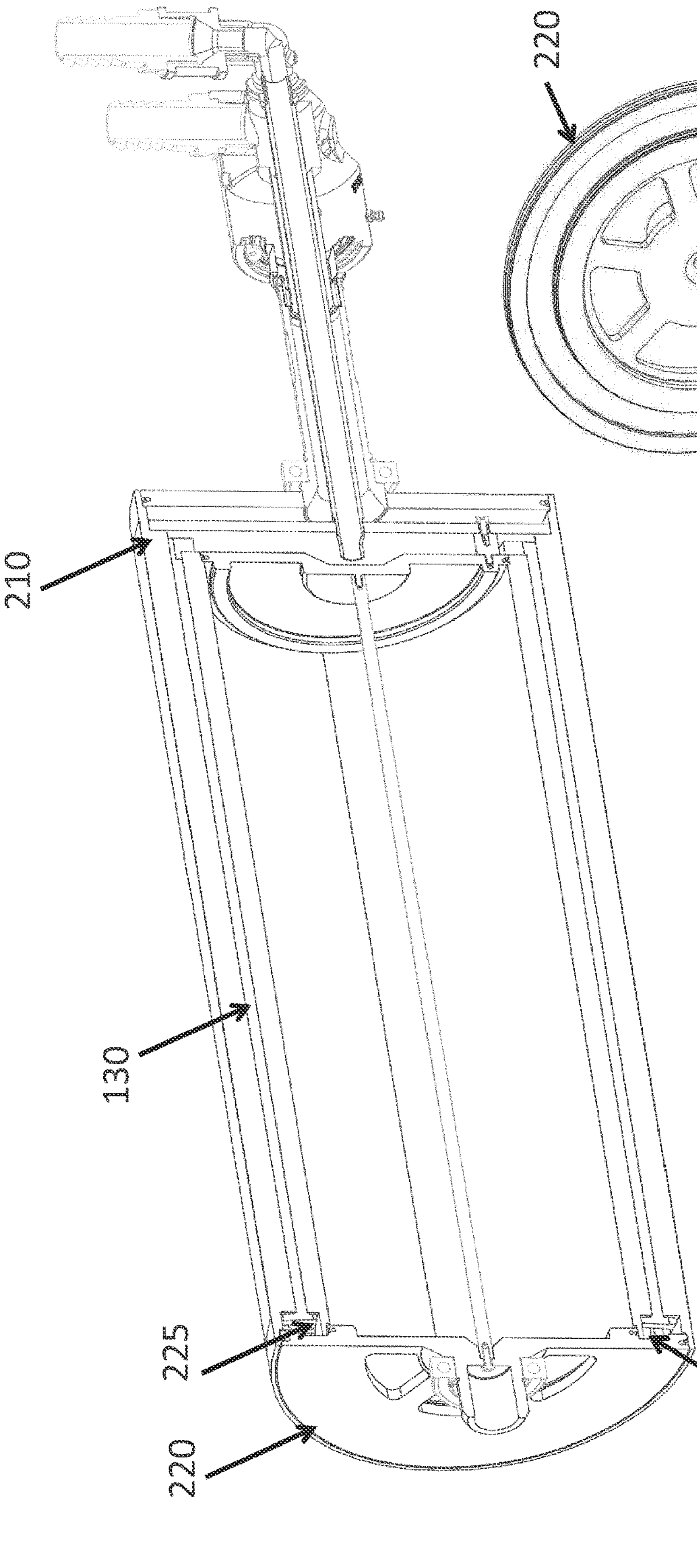
FIG. 12A illustrates a schematic cutaway perspective view of a cooling member with two coupling flanges.

FIG. 12A illustrates a further developed embodiment with a fluid circulation means comprising a first coupling flange 210 connected to the first end 110, a second coupling flange 220 connected to the second end 120. A fluid moving means such as a pump (not shown) may be connected to the first coupling flange. As illustrated in more detail in FIGS. 12C and 12D, the first coupling flange 210 comprises a central inlet 211 dividing in inlet branches 212 connected to the supply channels 130, and an outlet 215 dividing in outlet branches 116 connected to the return lines 140. The supply channels 130 and the return channel 140 may be implemented e.g. as in FIG. 3. In other embodiments, instead of multiple inlet branches a single common inlet area may be provided. Similarly, instead of multiple outlet branches a single common outlet area could be provided in the first coupling flange.

Figure 12B:
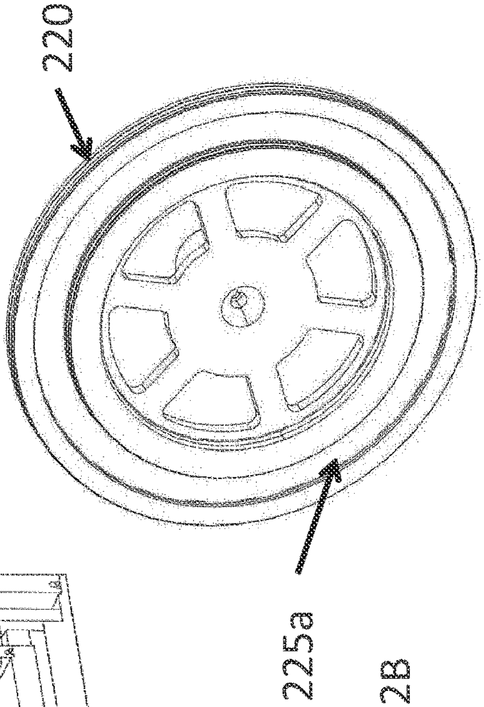
FIG. 12B shows a perspective view of the second coupling flange of FIG. 12A, looking at the inner side.
Figure 12D:
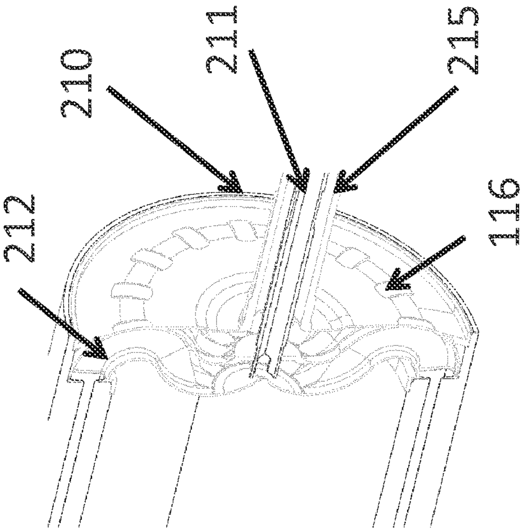
FIG. 12D is a cutaway perspective view looking at the first coupling flange.
Figure 12C:
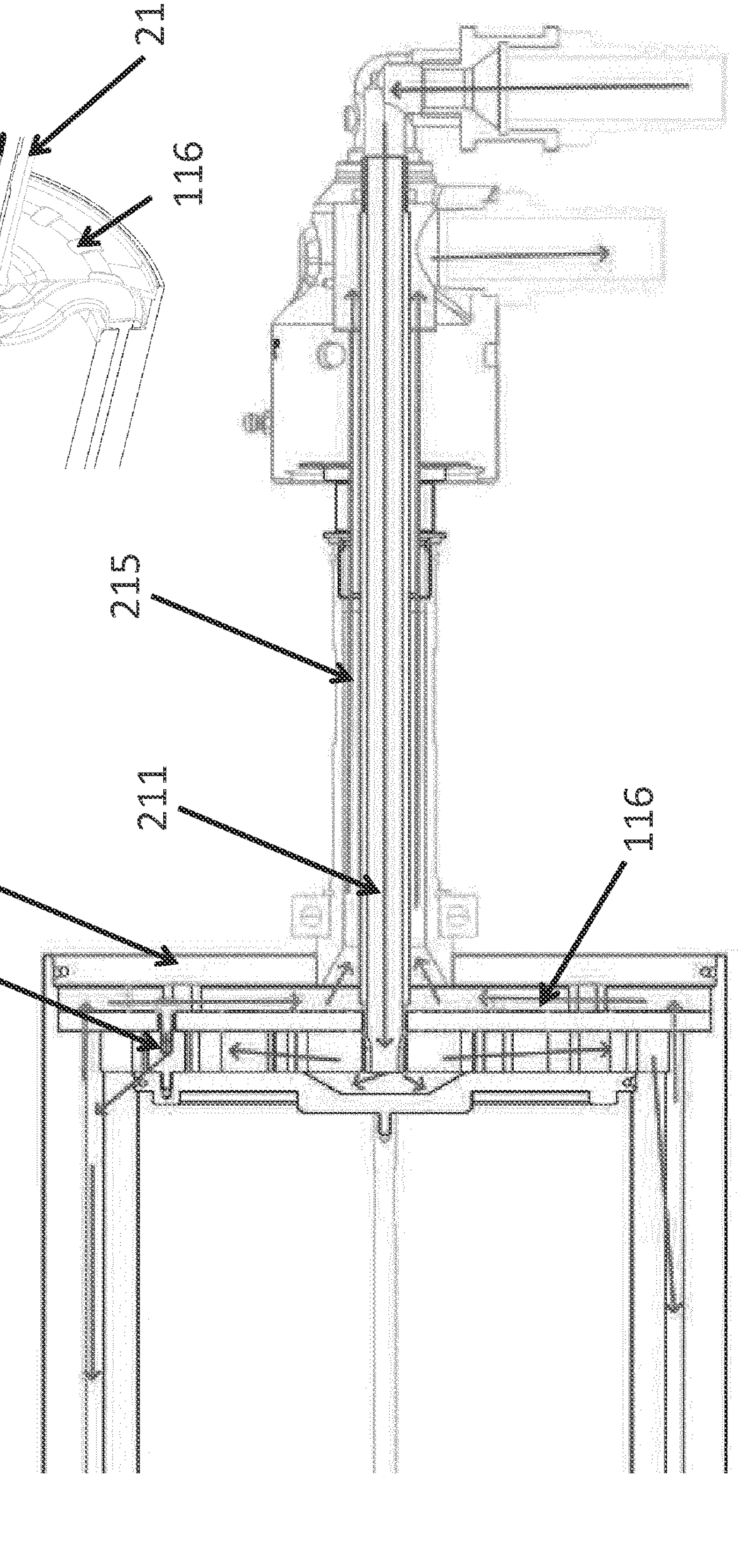
FIG. 12C shows a cross section of the inlet side illustrating the supply and return flows in the first coupling flange.

As shown in FIG. 12A, the second coupling flange 220 delimits a mixing chamber 225, and each supply line 130 and each return line 140 is connected to the mixing chamber 225. FIG. 12B shows a more detailed view of the second coupling flange 220 of FIG. 12A with a circular groove 225*a* extending in an inner surface of the coupling flange 220 for partially delimiting the mixing chamber 225. The mixing chamber 225 may be formed at least partially in the second coupling flange 220 and/or at least partially in the second end of the cooling member 100. The skilled person will understand that the mixing chamber could also be provided entirely in the second coupling flange 220 or entirely in the cooling member 100 if the cooling member 100 were to have a closed second end. By using a mixing chamber 225, differences in temperature between cooling fluid coming from a supply channel 130 above which a printing medium was present, and cooling fluid coming from a supply channel 130 above which no printing medium was present, can be compensated.

Figure 13B:
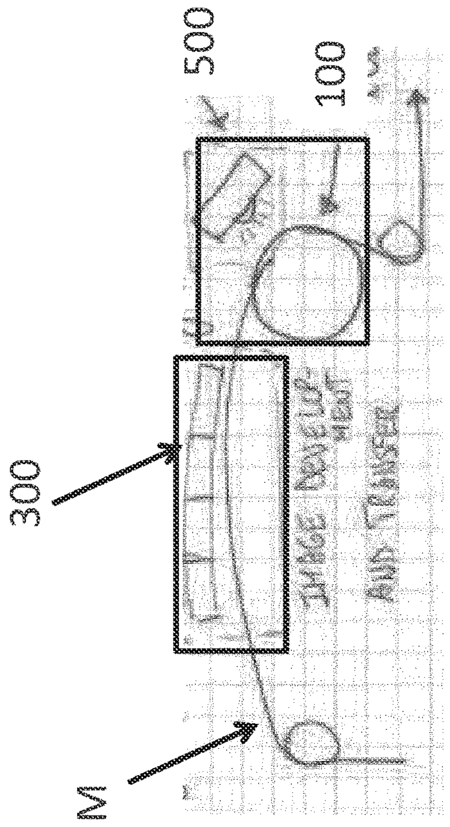
FIGS. 13A and 13B illustrate schematically two exemplary embodiments of a printing apparatus of the invention.
Figure 13A:
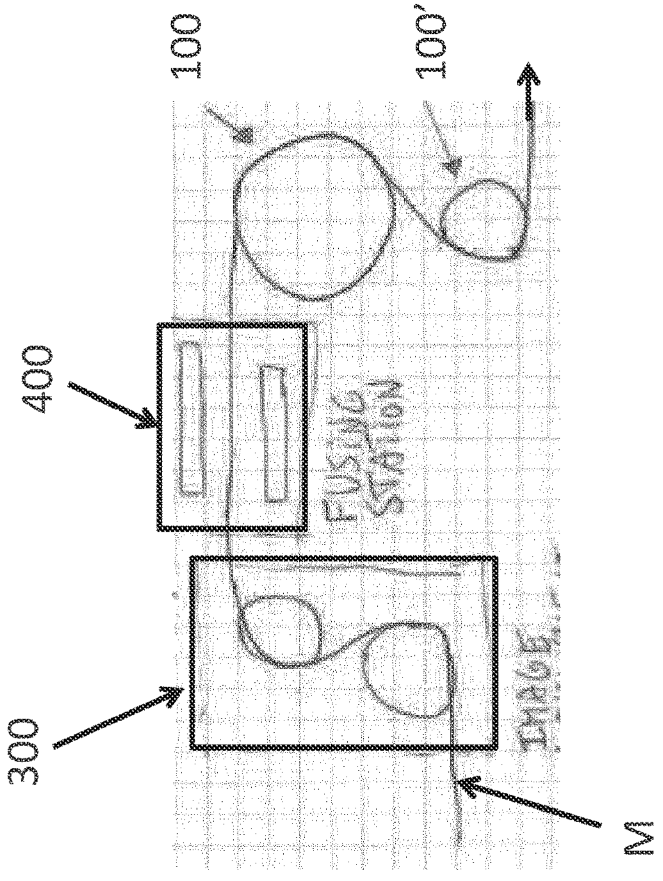

FIG. 13A illustrates an example of a printing apparatus, preferably a digital printing apparatus for printing on a medium M in which one or more cooling members 100 may be used. The example of FIG. 13A is a printing apparatus for use with toner or water-based ink. The printing apparatus comprises an image development and transfer unit 300 configured for printing an image on the medium M, and a fusing unit 400 configured for fixing an image printed by the image development and transfer unit 300. In the illustrated example two cooling members 100, 100' are arranged downstream of the fusing unit 400. However, in other examples only one cooling member 100 or more than two cooling members may be provided. In the illustrated example a cooling member 100 is arranged downstream of the fusing unit 400, but in addition or alternatively a cooling member may be arranged upstream of the fusing unit 400, e.g. between the image development and transfer unit 300 and the fusing unit 400, or in the fusing unit 400. In other words, using one or more cooling members 100, the temperature may be controlled before and/or during and/or after fusing.

The fusing unit 400 may be a contact fuser or a non-contact fuser. For example, the fusing unit 400 may comprise any one of the following: an ultraviolet (UV) dryer, a hot air dryer, an infrared (IR) or near-infrared (NIR) dryer, a microwave dryer, a contact dryer, an RF dryer, or any combination thereof. Also, the fusing unit 400 may be an intermediate fusing station for pinning an image printed by the image development and transfer unit 300. In the latter case, optionally a further image development and transfer unit 300 (not shown) may be provided downstream of the intermediate fusing unit 400.

FIG. 13B illustrates another example of a printing apparatus, preferably a digital printing apparatus for printing on a medium M in which one or more cooling members 100 may be used. The example of FIG. 13B is a printing apparatus for use with curable toner or ink, e.g. UV curable toner or ink. The printing apparatus comprises an image development and transfer unit 300 configured for printing an image on the medium M, and a curing unit 500 configured for curing an image printed by the image development and transfer unit 300, e.g. a UV curing unit. In the illustrated example one cooling members 100 is arranged in the curing unit 500 and is used for guiding the printing medium M opposite a curing member of the curing unit 500 whilst at the same time cooling the printing medium M. However, in other examples more than one cooling member may be provided. In the illustrated example a cooling member 100 is used in the curing unit 500, so that the medium is cooled during curing. Additionally or alternatively a cooling member may be arranged upstream of the curing unit 500, e.g. between the image development and transfer unit 300 and the curing unit 500, or downstream of the curing unit 500. In other words, using one or more cooling members 100, the temperature may be controlled before and/or during and/or after curing.

Although embodiments of the invention have been described with a reference to a cooling member, it is noted that the cooling member could be used for temperature regulation in general, i.e. both for cooling and for heating. Thus, the cooling member 100 may be used for transferring heat to or from a print medium M moving over the cooling member 100 in a movement direction through the printing apparatus. It is noted that in some printing apparatus the print medium M may first move in a first movement direction through the printing apparatus, towards the cooling member 100, and next in a second movement direction at an angle with respect to the first movement direction, away from the cooling member 100. Heat may be transferred away from the print medium M to the cooling member 100 by transporting the print medium M over the cooling member 100. In other words, the print medium M is cooled. Alternatively, heat may be transferred to the print medium M. In other words, the print medium M is heated. More generally, the cooling member 100 may be used in any printing apparatus which requires heat transfer from or to a print medium M.

The skilled person understands that many variants are possible for the number, shape and dimensions of the channels 130, 140, and that the number, shape and dimensions may be further optimised to improve the uniformity of the temperature along the cooling member.

In preferred embodiments of the invention, the cooling fluid is a liquid, preferably water or water-based. However, the fluid may also be a gas.

Particular embodiments of the invention relate to the field of digital printing apparatus and methods for so-called "continuous" webs, i.e. printing apparatus where a continuous roll of substrate (e.g., paper, plastic foil, or a multi-layer combination thereof) is run through the printing stations at a constant speed, in particular to print large numbers of copies of the same image(s), or alternatively, series of images, or even large sets of individually varying images.

Whilst the principles of the invention have been set out above in connection with specific embodiments, it is to be understood that this description is merely made by way of example and not as a limitation of the scope of protection which is determined by the appended claims.

The invention claimed is:

1. A printing apparatus comprising a cooling system for cooling a print medium moving in a movement direction through the printing apparatus, said cooling system comprising:

- a cooling member with a support surface configured for supporting the print medium, said cooling member having a first end and a second end and said support surface extending in a lateral direction at an angle with respect to the movement direction between said first end and said second end; wherein the cooling member is provided with supply channels and return channels extending between the first and the second end; and
- a fluid circulation means configured for supplying fluid through the supply channels from the first end to the second end, and back through the return channels from the second end to the first end; wherein the fluid circulation means comprises a first coupling flange connected to the first end and a second coupling flange connected to the second end; and
- a mixing chamber at the second end of the cooling member, wherein each supply channel and each return channel is connected to the mixing chamber, and wherein the mixing chamber is at least partially formed in the second coupling flange.

2. The printing apparatus of claim 1, wherein the supply channels comprise at least three supply channels, and wherein the return channels comprise at least three return channels.

3. The printing apparatus of claim 1, wherein the supply channels comprise at least six supply channels, and/or wherein the return channels comprise at least six return channels.

4. The printing apparatus of claim 1, wherein the supply and return channels are distributed according to a regular pattern comprising a sequence of at least one first supply channel, at least one first return channel, at least one second supply channel, and at least one second return channel.

5. The printing apparatus of claim 1, wherein the cooling member comprises a peripheral portion and wherein the supply and return channels are distributed across the peripheral portion.

6. The printing apparatus of claim 5, wherein the cooling member comprises a roller comprising the peripheral portion and a central portion; wherein preferably the central portion is at least partially hollow.

7. The printing apparatus of claim 6, wherein the roller has a diameter (d), and wherein the distance (a) between adjacent supply and return channels, seen along a circle adjoining the adjacent supply and return channels, is smaller than d/5.

8. The printing apparatus of claim 6, wherein the roller has a diameter (d), and wherein the distance (b) between the support surface and each channel of the supply and return channels is smaller than d/5; and wherein the diameter is larger than 30 mm.

9. The printing apparatus of claim 1, wherein the supply and return channels are substantially parallel.

10. The printing apparatus of claim 1, wherein seen in a cross-section perpendicular on the lateral direction, a total surface area of the supply channels is substantially equal to a total surface area of the return channels.

11. The printing apparatus of claim 1, wherein seen in a cross-section perpendicular on the lateral direction, the circumference of each channel is larger than a circumference of a circle with the same surface area.

12. The printing apparatus of claim 1, wherein seen in a cross-section perpendicular on the lateral direction, the circumference of each channel comprises inwardly protruding portions, and outwardly protruding portions.

13. The printing apparatus of claim 1, wherein the cooling member is made of any one of the following materials: aluminium, aluminium alloy, magnesium alloy, steel, copper, steel alloy, copper alloy, or a combination thereof;
- wherein the cooling member has a polished surface; and/or wherein the cooling member is provided with a coating at the support surface, wherein the coating is made of any one of the following materials: a polytetrafluoroethylene (PTFE) based material, a ceramic material, a diamond-like-carbon (DLC) material, and a metal.

14. The printing apparatus of claim 1, wherein the fluid circulation means comprises a first coupling flange connected to the first end and a second coupling flange connected to the second end; wherein the first coupling flange comprises a central inlet dividing in inlet branches connected to the supply channels, and an outlet dividing in outlet branches connected to the return lines, and wherein the outlet is coaxial with the inlet.

15. The printing apparatus of claim 1, wherein the fluid circulation means comprises a first set of tubes connected to the first end and a second set of tubes connected to the second end.

16. The printing apparatus of claim 1, wherein the cooling member comprises an inner part and an outer part, and wherein each supply and return channel is delimited by both the inner and the outer part.

17. The printing apparatus of claim 1, further comprising an image development and transfer unit, and a post-printing unit selected from at least one of a fusing unit, a drying unit and a curing unit, said post-printing unit being arranged downstream of the image development and transfer unit, and wherein the cooling member is arranged downstream of the post-printing unit, in the post-printing unit, or between the image development and transfer unit and the post-printing unit.

18. The printing apparatus of claim 1, wherein the cooling member is an extruded member.

19. A printing apparatus comprising a cooling system for cooling a print medium moving in a movement direction through the printing apparatus, said cooling system comprising:
- a cooling member with a support surface configured for supporting the print medium, said cooling member having a first end and a second end and said support surface extending in a lateral direction at an angle with respect to the movement direction between said first end and said second end; wherein the cooling member is provided with supply channels and return channels extending between the first and the second end; and
- a fluid circulation means configured for supplying fluid through the supply channels from the first end to the second end, and back through the return channels from the second end to the first end;
- wherein the cooling member comprises a peripheral portion and wherein the supply and return channels are distributed across the peripheral portion;
- wherein the cooling member comprises a roller comprising the peripheral portion and a central portion; wherein preferably the central portion is at least partially hollow; and
- wherein the supply and return channels comprise at least three supply channels and at least three return channels distributed along the circumference of the roller, and wherein at the second end, each supply channel of said at least three supply channels is connected to a return channel of said at least three return channels, said return channel being located in an opposite half of the roller at the second end as compared to the associated supply channel.

20. A printing apparatus comprising a cooling system for cooling a print medium moving in a movement direction through the printing apparatus, said cooling system comprising:
- a cooling member with a support surface configured for supporting the print medium, said cooling member having a first end and a second end and said support surface extending in a lateral direction at an angle with respect to the movement direction between said first end and said second end; wherein the cooling member is provided with supply channels and return channels extending between the first and the second end; and
- a fluid circulation means configured for supplying fluid through the supply channels from the first end to the second end, and back through the return channels from the second end to the first end;
- wherein the fluid circulation means comprises a first coupling flange connected to the first end and a second coupling flange connected to the second end; wherein the first coupling flange comprises a central inlet dividing in inlet branches connected to the supply channels, and an outlet dividing in outlet branches connected to the return lines, and wherein the outlet is coaxial with the inlet; and
- wherein the second coupling flange comprises connecting channels for connecting each supply channel to at least one return channel of the return channels, wherein the connecting channels are arranged such that each supply channel ending in a first half of the cooling member is connected to a return channel starting in an opposite half of the cooling member.

21. The printing apparatus of claim 20, further comprising a mixing chamber at the second end of the cooling member, wherein each supply channel and each return channel is connected to the mixing chamber, and wherein the mixing chamber is at least partially formed in the second coupling flange.

* * * * *